(12) United States Patent
Resendes et al.

(10) Patent No.: US 7,256,244 B2
(45) Date of Patent: Aug. 14, 2007

(54) PROCESS FOR PRODUCTION OF HIGH-ISOPRENE BUTYL RUBBER

(75) Inventors: R. Resendes, Sarnia (CA); Rudolf Casper, deceased, late of Leverkusen (DE); by Rotraud Casper, legal representative, Leverkusen (DE); William E. App, Alvinston (CA); Gerhard Langstein, Kurten (DE); Martin Bohnenpoll, Leverkusen (DE); Gabor Kaszas, London (CA); Stephan Glander, Leverkusen (DE)

(73) Assignee: Lanxess Inc., Sarnia, Ontario (CA)

( * ) Notice: Subject to any disclaimer, the term of this patent is extended or adjusted under 35 U.S.C. 154(b) by 261 days.

(21) Appl. No.: 10/726,455

(22) Filed: Dec. 3, 2003

(65) Prior Publication Data

US 2004/0220328 A1 Nov. 4, 2004

(30) Foreign Application Priority Data

Dec. 5, 2002 (CA) ................... 2413611

(51) Int. Cl.
*C08F 4/14* (2006.01)
*C08F 210/12* (2006.01)

(52) U.S. Cl. ............... 526/220; 526/226; 526/236; 526/237

(58) Field of Classification Search .......... 526/220, 526/236, 226, 237
See application file for complete search history.

(56) References Cited

U.S. PATENT DOCUMENTS

| | | | | |
|---|---|---|---|---|
| 2,076,201 A * | 4/1937 | Langedijk et al. | .......... | 208/297 |
| 2,356,128 A | 8/1944 | Thomas et al. | ................ | 260/79 |
| 2,433,025 A | 12/1947 | Calfee et al. | .................. | 260/93 |
| 2,568,656 A | 9/1951 | Parrish | ....... | 260/88.1 |
| 3,928,297 A | 12/1975 | Thaler et al. | ............... | 260/85.3 |
| 4,870,144 A | 9/1989 | Noda et al. | .................. | 526/216 |
| 5,012,030 A | 4/1991 | Lane et al. | .................. | 585/527 |
| 6,015,841 A | 1/2000 | Langstein et al. | ............ | 522/29 |
| 6,252,021 B1 | 6/2001 | Lee et al. | .................... | 526/142 |
| 6,562,916 B2 | 5/2003 | Langstein et al. | ............. | 526/89 |
| 2001/0014726 A1 * | 8/2001 | Langstein et al. | .......... | 526/217 |
| 2002/0086959 A1 | 7/2002 | Langstein et al. | .......... | 526/157 |
| 2003/0199647 A1 | 10/2003 | Langstein et al. | ............. | 526/89 |

FOREIGN PATENT DOCUMENTS

| EP | 969 026 | 1/2000 |
|---|---|---|
| GB | 600317 | 11/1944 |

OTHER PUBLICATIONS

Ullmanns Encyclopedia of Industrial Chemistry, vol. A 23, (month unavailable) 1993, pp. 288-295, "Rubber, 3. Synthetic".
Rubber Chemistry & Technology, 49, (month unavailable) 1976, pp. 960-966, W.A. Thaler, D.J. Buckley Sr., Meeting of the Rubber Division, ACS, Cleveland, Ohio, May 6-9, 1975, "High-Molecular-Weight, High-Unsaturation Copolymers of Isobutylene and Conjugated Dienes. I. Synthesis".

* cited by examiner

*Primary Examiner*—Fred Teskin
(74) *Attorney, Agent, or Firm*—Jennifer R. Sang

(57) ABSTRACT

The present invention relates to a process for producing polymers comprising repeating units derived from at least one isoolefin monomer, at least one multiolefin monomer and optionally further copolymerization monomers in the presence of at least one organic nitro compound and AlCl3/ water wherein the process is conducted in the absence of compounds selected from the group consisting of vanadium compounds, zirconium halogenid, and hafnium hallogenides.

6 Claims, 2 Drawing Sheets

PROCESS FOR PRODUCTION OF HIGH-ISOPRENE BUTYL RUBBER

FIELD OF THE INVENTION

The present invention relates to a process for producing polymers comprising repeating units derived from at least one isoolefin monomer, at least one multiolefin monomer and optionally further copolymerizable monomers in the presence of at least one organic nitro compound and $AlCl_3$/water wherein the process is conducted in the absence of compounds selected from the group consisting of vanadium compounds, zirconium halogenid, hafnium halogenides.

Preferably the polymers have a multiolefin content of greater than 2.5 mol %, and a molecular weight $M_w$ of greater than 240 kg/mol.

BACKGROUND OF THE INVENTION

Butyl rubber is understood to be a copolymer of an isoolefin and one or more, preferably conjugated, multiolefins as comonomers. Commercial butyl comprise a major portion of isoolefin and a minor amount, not more than 2.5 wt %, of a conjugated multiolefin. The preferred isoolefin is isobutylene. However, this invention also covers polymers optionally comprising additional copolymerizable comonomers.

Butyl rubber or butyl polymer is generally prepared in a slurry process using methyl chloride as a vehicle and a Friedel-Crafts catalyst as the polymerization initiator. The methyl chloride offers the advantage that $AlCl_3$ a relatively inexpensive Friedel-Crafts catalyst is soluble in it, as are the isobutylene and isoprene comonomers. Additionally, the butyl rubber polymer is insoluble in the methyl chloride and percipitates out of solution as fine particles. The polymerization is generally carried out at temperatures of about $-90°$ C. to $-100°$ C. See U.S. Pat. No. 2,356,128 and *Ullmanns Encyclopedia of Industrial Chemistry*, volume A 23, 1993, pages 288-295. The low polymerization temperatures are required in order to achieve molecular weights which are sufficiently high for rubber applications.

Raising the reaction temperature or increasing the quantity of isoprene in the monomer feed results in poorer product properties, in particular, in lower molecular weights. However, a higher degree of unsaturation would be desirable for more efficient crosslinking with other, highly unsaturated diene rubbers (BR, NR or SBR).

The molecular weight depressing effect of diene comonomers may, in principle, be offset by still lower reaction temperatures. However, in this case the secondary reactions, which result in gelation occur to a greater extent and these processes are more costly. Gelation at reaction temperatures of around $-120°$ C. and possible options for the reduction thereof have been described (c.f. W. A. Thaler, D. J. Buckley Sr., Meeting of the Rubber Division, ACS, Cleveland, Ohio, May 6-9, 1975, published in *Rubber Chemistry & Technology* 49, 960-966 (1976)). The auxiliary solvents such as $CS_2$ required for this purpose are not only difficult to handle, but must also be used at relatively high concentrations.

U.S. Pat. No. 2,568,656 discloses copolymers of isobutene and 1-vinyl-cyclo-3-hexene. The document is silent about water and multiolefins.

It is furthermore known to perform gel-free copolymerization of isobutene with various comonomers to yield products of a sufficiently high molecular weight for rubber applications at temperatures of around $-40°$ C. using pretreated vanadium tetrachloride (EP-A1-818 476), a combination of nitro compounds and vanadium (EP-A-1 122 267) or zirconium compounds (WO-02/18460-A1) and others.

This invention operates in the absence of vanadium-, zirconium- and/or hafnium compounds.

Halogenated butyls are well known in the art, and possess outstanding properties such as oil and ozone resistance and improved impermeability to air. Commercial halobutyl rubber is a halogenated copolymer of isobutylene and up to about 2.5 wt % of isoprene.

SUMMARY OF THE INVENTION

Figure 1:
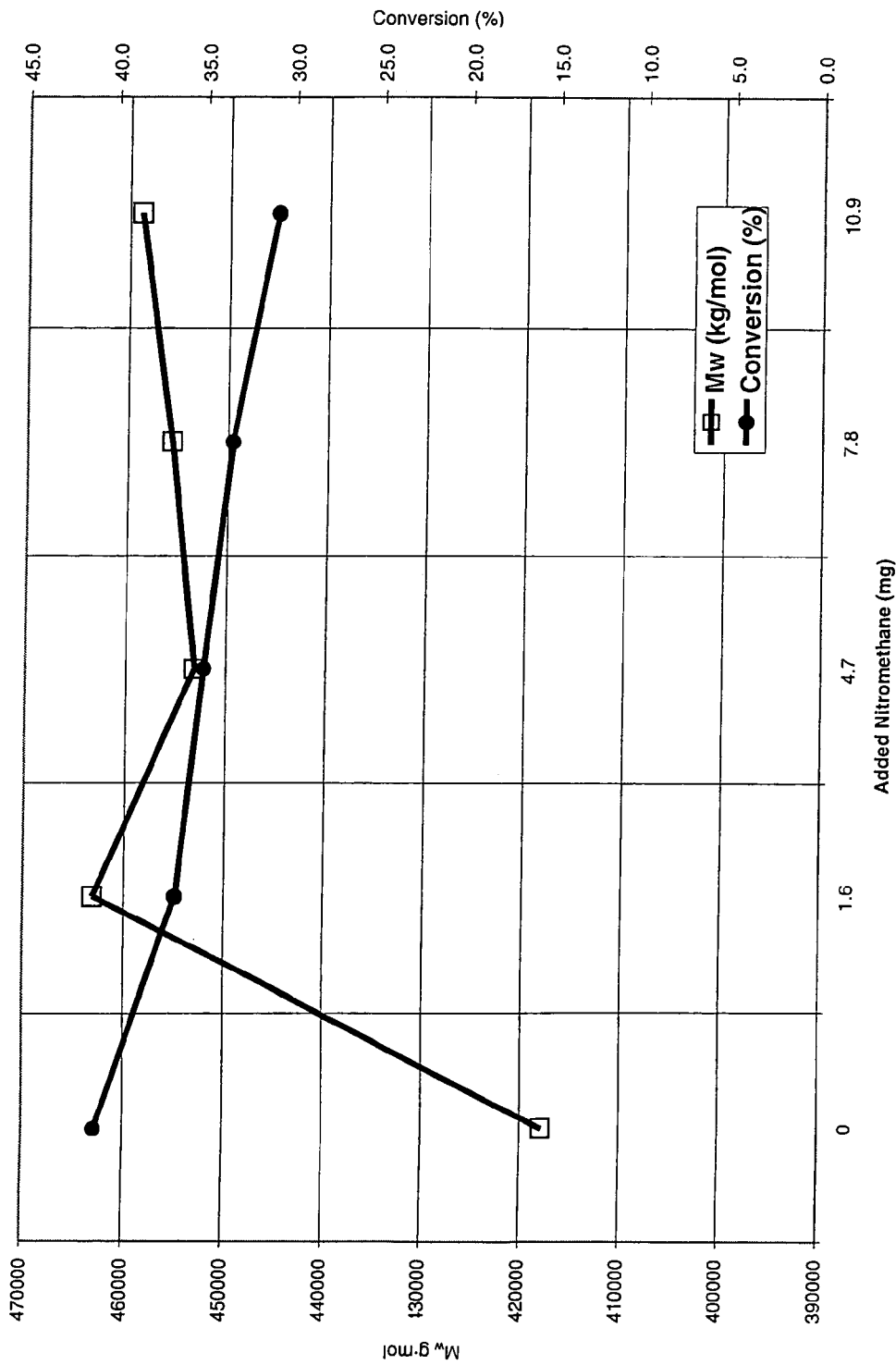
FIG. 1 shows the dependence of $M_w$ on $CH_3NO_2$ addition.

In one aspect, the present invention a process for producing polymers comprising repeating units derived from at least one isoolefin monomer, at least one multiolefin monomer and optionally further copolymerizable monomers in the presence of at least one organic nitro compound and $AlCl_3$/water wherein the process is conducted in the absence of compounds selected from the group consisting of vanadium compounds, zirconium halogenid, hafnium halogenides.

In another aspect, the present invention provides a process for producing polymers with a multiolefin content of greater than 2.5 mol % comprising repeating units derived from at least one isoolefin monomer, at least one multiolefin monomer and optionally further copolymerizable monomers in the presence of at least one organic nitro compound and $AlCl_3$/water wherein the process is conducted in the absence of compounds selected from the group consisting of vanadium compounds, zirconium halogenid, hafnium halogenides.

In still another aspect, the present invention provides a process for producing polymers with a molecular weight $M_w$ of greater than 240 kg/mol comprising repeating units derived from at least one isoolefin monomer, at least one multiolefin monomer and optionally further copolymerizable monomers in the presence of at least one organic nitro compound and $AlCl_3$/water wherein the process is conducted in the absence of compounds selected from the group consisting of vanadium compounds, zirconium halogenid, hafnium halogenides.

In still another aspect, the present invention provides a process for producing polymers with a multiolefin content of greater than 2.5 mol % and a molecular weight $M_w$ of greater than 240 kg/mol comprising repeating units derived from at least one isoolefin monomer, at least one multiolefin monomer and optionally further copolymerizable monomers in the presence of at least one organic nitro compound and $AlCl_3$/water wherein the process is conducted in the absence of compounds selected from the group consisting of vanadium compounds, zirconium halogenid, hafnium halogenides.

In still another aspect, the present invention provides a process for producing polymers with a multiolefin content of greater than 2.5 mol % and a molecular weight $M_w$ of greater than 240 kg/mol comprising repeating units derived from isobutene, isoprene and optionally further monomers in the presence of at least one organic nitro compound and $AlCl_3$/water wherein the process is conducted in the absence of compounds selected from the group consisting of vanadium compounds, zirconium halogenid, hafnium halogenides.

DETAILED DESCRIPTION OF THE INVENTION

The invention is not limited to a special isoolefin. However, isoolefins with in the range of from 4 to 16 carbon atoms, in particular 4-7 carbon atoms, such as isobutene, 2-methyl-1-butene, 3-methyl-1-butene, 2-methyl-2-butene, 4-methyl-1-pentene and mixtures thereof are preferred. Most preferred isobutene.

The invention is not limited to a special multiolefin. Every multiolefin copolymerizable with the isoolefin known by the skilled in the art can be used. However, multiolefins with in the range of from 4-14 carbon atoms, such as isoprene, butadiene, 2-methylbutadiene, 2,4-dimethylbutadiene, piperyline, 3-methyl-1,3-pentadiene, 2,4-hexadiene, 2-neopentylbutadiene, 2-methly-1,5-hexadiene, 2,5-dimethly-2,4-hexadiene, 2-methyl-1,4-pentadiene, 2-methyl-1,6-heptadiene, cyclopenta-diene, methylcyclopentadiene, cyclohexadiene, 1-vinyl-cyclohexadiene and mixtures thereof, in particular conjugated dienes, are preferabely used. Isoprene and/or beta-pinene is particularly preferably used.

As optional monomers every monomer copolymerizable with the isoolefins and/or dienes known by the skilled in the art can be used. α-methyl styrene, α-methyl styrene, chlorostyrene, cyclopentadiene and methylcyclopentadiene are preferably used.

The multiolefin content is preferably greater than 2.5 mol %, more preferably greater than 3.5 mol %, even more preferably greater than 5 mol %, yet even more preferably greater than 7 mol %.

Preferably, the monomer mixture comprises in the range of from 80% to 99% by weight of at least one isoolefin monomer and in the range of from 1.0% to 20% by weight of at least one multiolefin monomer including β-pinene. More preferably, the monomer mixture comprises in the range of from 85% to 99% by weight of at least one isoolefin monomer and in the range of from 1.0% to 10% by weight of a multiolefin monomer or β-pinene. Most preferably, the monomer mixture comprises in the range of from 95% to 99% by weight of at least one isoolefin monomer and in the range of from 1.0% to 5.0% by weight of at least one multiolefin monomer, including β-pinene.

The molecular weight $M_w$ is preferably greater than 240 kg/mol, more preferably greater than 300 kg/mol, even more preferably greater than 350 kg/mol, yet even more preferably greater than 400 kg/mol.

The gel content is preferably less than 1.2 wt. %, more preferably less than 1 wt %, even more preferably less than 0.8 wt %, yet even more preferably less than 0.7 wt %.

The polymerization is performed in the presence of at least one organic nitro compound and $AlCl_3$/water. The preferred ratio of $AlCl_3$ to water is between 30:1 to 50:1 by weight, more preferred between 50:1 and 100:1 by weight, and even more preferably from 100:1 to 150:1 by weight. It might be advantageous to further introduce from $AlCl_3$ deriveable catalyst systems, diethylaluminium chloride, ethylaluminium chloride, titanium tetrachloride, stannous tetrachloride, boron trifluoride, boron trichloride, or methylalumoxane.

The organic nitro compounds used in this process are widely known and generally available. The nitro compounds preferably used according to the invention are disclosed in copending DE 100 42 118.0 which is incorporated by reference herein for the purpose of jurisdictions allowing for this procedure and are defined by the general formula (I)

$$R—NO_2 \quad (I)$$

wherein R is selected from the group H, $C_1$-$C_{18}$ alkyl, $C_3$-$C_{18}$ cycloalkyl or $C_6$-$C_{24}$ cycloaryl.

$C_1$-$C_{18}$ alkyl is taken to mean any linear or branched alkyl residues with 1 to 18 C atoms known to the person skilled in the art, such as methyl, ethyl, n-propyl, i-propyl, n-butyl, i-butyl, t-butyl, n-pentyl, i-pentyl, neopentyl, hexyl and further homologues, which may themselves in turn be substituted, such as benzyl. Substituents, which may be considered in this connection, are in particular alkyl or alkoxy and cycloalkyl or aryl, such benzoyl, trimethylphenyl, ethylphenyl. Methyl, ethyl and benzyl are preferred.

$C_6$-$C_{24}$ aryl means any mono- or polycyclic aryl residues with 6 to 24 C atoms known to the person skilled in the art, such as phenyl, naphthyl, anthracenyl, phenanthracenyl and fluorenyl, which may themselves in turn be substituted. Substituents which may in particular be considered in this connection are alkyl or alkoxyl, and cycloalkyl or aryl, such as toloyl and methylfluorenyl. Phenyl is preferred.

$C_3$-$C_{18}$ cycloalkyl means any mono- or polycyclic cycloalkyl residues with 3 to 18 C atoms, such as cyclopropyl, cyclobutyl, cyclopentyl, cyclohexyl, cycloheptyl, cyclooctyl and further homologues, which may themselves, in turn, be substituted. Substituents which may, in particular, be considered in this connection are alkyl or alkoxy, and cycloalkyl or aryl, such as benzoyl, trimethylphenyl, ethylphenyl. Cyclohexyl and cyclopentyl are preferred.

The polymerization is preferably performed in a suitable solvent, such as chloroalkanes, in such a manner that the organic nitro compound(s) are added to the monomer mixture directly and not as a $AlCl_3$-adduct.

The concentration of the organic nitro compound in the reaction medium is preferably in the range from 1 to 15000 ppm, more preferably in the range from 5 to 500 ppm. The ratio of nitro compound to aluminum is preferably in the range of 1:1 to 1:50 by weight and most preferably in the range from 1:3 to 1:25 by weight.

The monomers are generally polymerized cationically, preferably at temperatures in the range from −120° C. to +20° C., preferably in the range from −100° C. to −20° C., and pressures in the range from 0.1 to 4 bar.

Inert solvents or diluents known to the person skilled in the art for butyl polymerization may be considered as the solvents or diluents (reaction medium). These comprise alkanes, chloroalkanes, cycloalkanes or aromatics, which are also mono- or polysubstituted with halogens. Hexane/chloroalkane mixtures, methyl chloride, dichloromethane or the mixtures thereof may be mentioned in particular. Chloroalkanes are preferably used in the process according to the present invention.

Polymerization may be performed both continuously and discontinuously. In the case of continuous operation, the process is preferably performed with the following three feed streams:

I) solvent/diluent+isoolefin (preferably isobutene)
II) multiolefin (preferably diene, isoprene)+organic nitro compound
III) catalyst In the case of discontinuous operation, the process may, for example, be performed as follows:

The reactor, precooled to the reaction temperature, is changed with solvent or diluent, the monomers and with the nitro compound. The $AlCl_3$ is then pumped in the form of a dilute solution in such a manner that the heat of polymerization may be dissipated without problem. The course of the reaction may be monitored by means of the evolution of heat.

All operations are performed under protective gas. Once polymerization is complete, the reaction is terminated with a phenolic antioxidant, such as, for example, 2,2'-methylenebis(4-methyl-6-tert.-butylphenol), dissolved in ethanol.

Using the process according to the present invention, it is possible to produce novel high molecular weight isoolefin copolymers having elevated double bond contents and simultaneously low gel contents. The double bond content is determined by proton resonance spectroscopy.

This process provides isoolefin copolymers with a comonomer content of greater than 2.5 mol %, a molecular weight $M_w$ of greater than 240 kg/mol and a gel content of less than 1.2 wt. %.

These copolymers may be the starting material for a halogenation process in order to produce halo-butyl polymers.

The copolymers presented in this invention are ideally suitable for the production of moldings of all kinds, in particular tyre components and industrial rubber articles, such as bungs, damping elements, profiles, films, coatings. The polymers are used to this end in pure form or as a mixture with other rubbers, such as NR, BR, HNBR, NBR, SBR, EPDM or fluororubbers. The preparation of these compounds is known to the skilled in the art. In most cases carbon black is added as filler and a sulfur based curing system is used. For the compounding and vulcanization it is referred to Encyclopedia of Polymer Science and Engineering, Vol. 4, S. 66 et seq. (Compounding) and Vol. 17, S. 666 et seq. (Vulcanization).

The vulcanization of the compounds is usually effected at temperatures in the range of 100 to 200° C., preferred 130 to 180° C. (optionally under pressure in the range of 10 to 200 bar).

The following Examples are provided to illustrate the present invention:

EXAMPLES

Experimental Details

GPC analysis was performed by a combination of four, 30 cm long columns from the company Polymer Laboratories (PL-Mixed A). The internal diameter of the columns was 0.75 cm). Injection volume was 100 µl. Elution with THF was performed at 0.8 ml/min. Detection was performed with a UV detector (260 nm) and a refractometer.

Isobutene (Praxair) was purified by purging through a column filled with sodium on aluminum oxide (Na-content 10%).

Isoprene was purified by purging through a column filled with dried aluminum oxide, and destined under nitrogen over calcium hydride. The water content was <10 ppm.

Methyl chloride was purified by purging through a column filled with active carbon black and another column with Sicapent.

Nitromethane (Fa. Aldrich, 96%) was stirred for 2 hours over phosphorous pentoxide, during this stirring nitrogen was purged through the mixture. Then the nitromethane was destined in vacuo (about 20 mbar).

Examples 1-5

The following experiments illustrate the utility of $CH_3NO_2$ in the $AlCl_3$ initiated polymerization of IIR. For all of the polymerizations described by Table 1, the noted amounts of Isobutylene, Isoprene and $CH_3NO_2$ were added to 180 mL of $CH_3Cl$ cooled to −95° C. Once the reaction mixture has reached thermal equilibrium, the corresponding amount of $AlCl_3$ (introduced as a solution in $CH_3Cl$, 300 mg of $AlCl_3$ dissolved in 200 mL of $CH_3Cl$) was added with the use of a pre-cooled, glass pipet. The reaction was allowed to proceed for the length of time required to attain the equilibrium temperature prior to catalyst addition.

TABLE 1

$AlCl_3/CH_3NO_2$ Polymerization Details.

| Example | Isobutylene (mL) | Isoprene (mL) | Amount $AlCl_3$ (mg) | $CH_3NO_2$ Amount (mg) |
|---|---|---|---|---|
| 1 | 20.0 | 3.0 | 35 | 0.0 |
| 2 | 20.0 | 3.0 | 35 | 1.6 |
| 3 | 20.0 | 3.0 | 35 | 4.7 |
| 4 | 20.0 | 3.0 | 35 | 7.8 |
| 5 | 20.0 | 3.0 | 35 | 10.9 |

FIG. 1 shows the dependance of $M_w$ on $CH_3NO_2$ addition.

As can be seen from FIG. 1, the incorporation of nitromethane in the polymerization of high IP IIR has a pronounced positive effect on the molecular weight of the final elastomer.

However, as more nitromethane is introduced into the polymerization mixture, the conversion decreases.

For comparison, a series of polymerizations were conducted in which previously studied catalyst systems were introduced into monomer mixtures like those described in Table 1. Specifically, the $AlCl_3$, $ZrCl_3/CH_3NO_2$ and $ZrCl_3/CH_3C(O)Cl$ were examined.

Example 6 (Comparative)

Figure 2:
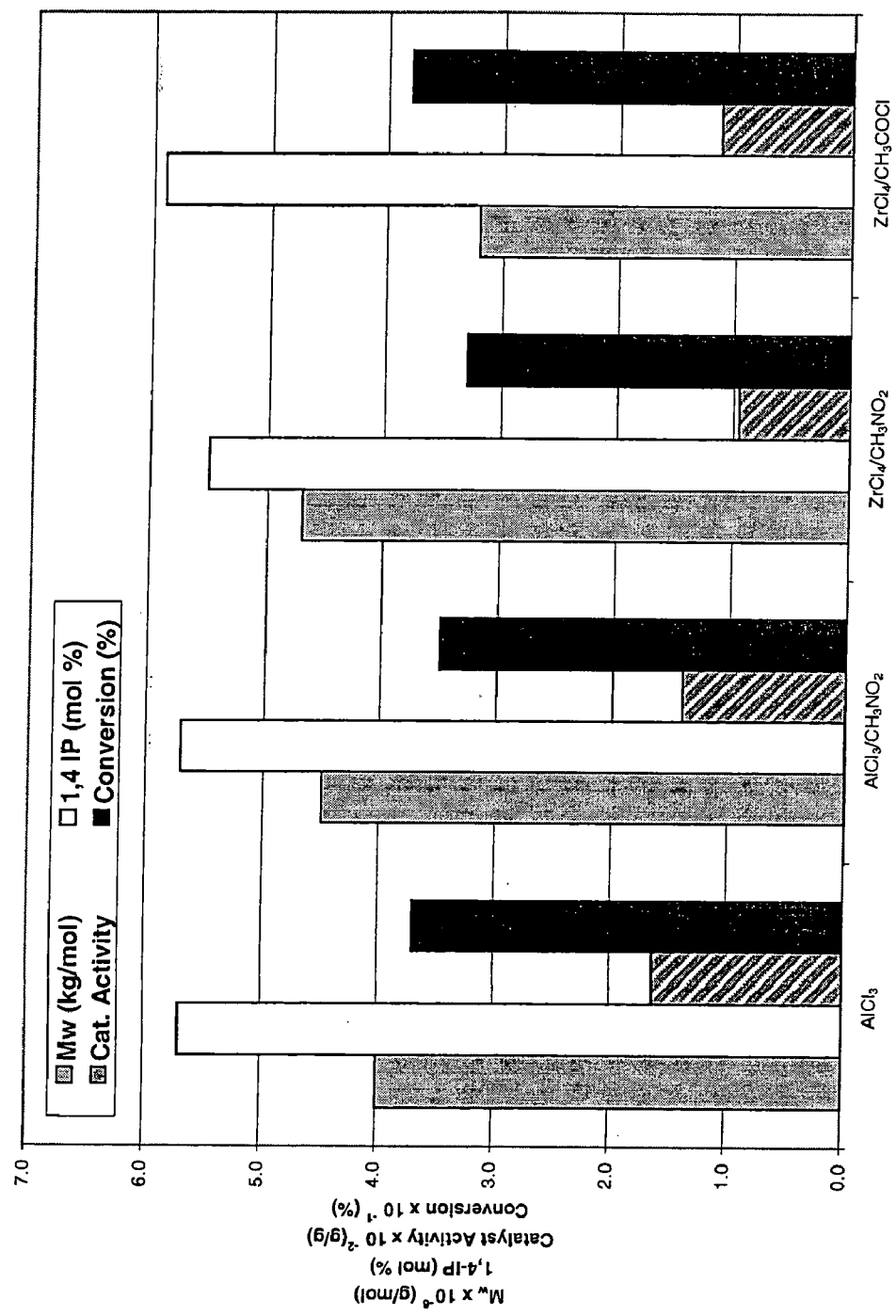
FIG. 2 shows a comparison of the $AlCl_3/CH_3NO_2$ system with other catalyst systems.

For the polymerization experiment utilizing $AlCl_3$, 20 mL of Isobutene and 3 mL of Isoprene were dissolved in 180 mL of MeCl. This solution was then cooled to −95° C. at which point 35 mg of $AlCl_3$ (introduced as a solution in $CH_3Cl$, 300 mg of $AlCl_3$ dissolved in 200 mL of $CH_3Cl$—the time for complete dissolution at −30° C. was 5 minutes) was added with the use of a pre-cooled, glass pipette. The reaction was allowed to proceed for the length of time required to attain the equilibrium temperature prior to catalyst addition. The result is shown in FIG. 2.

Example 7 (Comparative)

For the polymerization experiment utilizing $ZrCl_4/CH_3NO_2$, 20 mL of Isobutene and 3 mL of Isoprene were dissolved in 180 mL of MeCl. This solution was then cooled to −95° C. at which point 45 mL of a $ZrCl_4/CH_3NO_2$ catalyst solution (5 mL of $ZrCl_4/CH_3NO_2$ premix in 91 mL of MeCl; $ZrCl_4/CH_3NO_2$ premix consisted of 13.6 g of $ZrCl_4$ and 47.25 g of $CH_3NO_2$ dissolved in 500 mL of $CH_2Cl_2$—the time for complete dissolution of the premix at −30° C. was about 45 minutes) was added with the use of a pre-cooled, glass pipette. The reaction was allowed to proceed for the length of time required to attain the equilibrium temperature prior to catalyst addition. The result is shown in FIG. 2.

Example 8 (Comparative)

For the polymerization experiment utilizing $ZrCl_4/CH_3C(O)Cl$, 20 mL of Isobutene and 3 mL of Isoprene were dissolved in 180 mL of MeCl. This solution was then cooled to −95° C. at which point 35 mL of a $ZrCl_4/CH_3C(O)Cl$ catalyst solution (0.134 g of $ZrCl_4$ and 0.057 mL of $CH_3C$ (O)Cl dissolved in 100 mL of MeCl) was added with the use of a pre-cooled, glass pipette. The reaction was allowed to proceed for the length of time required to attain the equilibrium temperature prior to catalyst addition. The result is shown in FIG. 2.

FIG. 2. compares the novel $AlCl_3/CH_3NO_2$ system with other catalyst systems.

The $AlCl_3/CH_3NO_2$ system was found to be as effective in the production of high IP IIR as was the previously described $ZrCl_4/CH_3NO_2$ system. Importantly, this system has the added advantage of utilizing a more cost effective Lewis Acid (cf. $ZrCl_4$) while at the same time not requiring prolonged catalyst dissolution times (as was observed in the $ZrCl_4$ system) which makes it more feasible to incorporate the inventive $AlCl_3/CH_3NO_2$ system into existing plant environments.

Furthermore, as can be seen from FIG. 2, the optimized $AlCl_3/CH_3NO_2$ system was found to perform as well as the $ZrCl_4/CH_3NO_2$ system in terms of molecular weight and IP incorporation and superior to the latter system with respect to catalyst activity (g/g). Also depicted in FIG. 2 is the apparent improvement in molecular weight observed for the $AlCl_3/CH_3NO_2$ as compared to the previously studied $ZrCl_4/CH_3(CO)Cl$ system and the $AlCl_3$ control system.

The invention claimed is:

1. A process for producing polymers having repeating units derived from at least one isoolefin monomer, at least one multiolefin monomer and, optionally, further copolymerizable monomers comprising:

providing at least one isoolefin monomer, at least one multiolefin monomer, and, optionally, further copolymerizable monomers; and polymerizing the at least one isoolefin monomer, at least one multiolefin monomer, and, optionally, further copolymerizable monomers in the presence of from 5 to 500 ppm of at least one organic nitro containing compound or H—$NO_2$ and $AlCl_3$/water in the absence of compounds selected from the group consisting of vanadium compounds, zirconium halogenid, and hafnium halogenides.

2. The process according to claim 1, wherein said organic nitro containing compound is of the general formula (I)

R—$NO_2$ (I)

wherein R is selected from the group consisting of $C_1$-$C_{18}$ alkyl, $C_3$-$C_{18}$ cycloalkyl or $C_6$-$C_{24}$ cycloaryl.

3. The process according to claim 1, wherein said at least one isoolefin monomer is isobutene.

4. The process according to claim 1, wherein said at least one multiolefin monomer is isoprene.

5. The process according to claim 1, wherein said at least one multiolefin monomer is provided at a concentration of greater than 2.5 mol %.

6. The process according to claim 1, wherein said polymers have a molecular weight $M_w$ of greater than 240 kg/mol.

* * * * *